(12) United States Patent
Hjelm et al.

(10) Patent No.: US 8,649,765 B1
(45) Date of Patent: Feb. 11, 2014

(54) COMMUNICATION APPARATUS USING BIOMETRICS

(75) Inventors: Johan Hjelm, Dynacity (JP); Joakim Soderberg, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/569,858

(22) Filed: Aug. 8, 2012

(51) Int. Cl.
*H04M 1/66* (2006.01)

(52) U.S. Cl.
USPC ............. 455/410; 455/411; 455/550.1; 726/7

(58) Field of Classification Search
USPC ............. 455/410, 411, 550.1; 726/7; 713/323
See application file for complete search history.

(56) References Cited

U.S. PATENT DOCUMENTS

| 6,466,781 | B1 | 10/2002 | Bromba et al. | |
|---|---|---|---|---|
| 2010/0045787 | A1* | 2/2010 | Uno | 348/77 |
| 2010/0117791 | A1* | 5/2010 | Inoue et al. | 340/5.52 |
| 2010/0287396 | A1* | 11/2010 | Barth et al. | 713/323 |
| 2011/0314530 | A1* | 12/2011 | Donaldson | 726/7 |

FOREIGN PATENT DOCUMENTS

WO   WO 2008/061138 A2   5/2008

OTHER PUBLICATIONS

International Search Report, Application No. PCT/SE2012/050968, Apr. 11, 2013.
3GPP, Techinical Report—3$^{rd}$ Generation Partnership Project; Technical Specification Group Services and Systems Aspects; Feasibility study on the security aspects of remote provisioning and change of subscription for Machine to Machine (M2M) equipment (Release 9), TR 33.812 V9.2.0 (Jun. 2010), 87 pp.
Kumar et al., "Using Continuous Biometric Verification to Protect Interactive Login Sessions," *ACSAC '05 Proceedings of the 21st Annual Computer Security Applications Conference*, Dec. 5, 2005, pp. 441-450.
Wang et al., "Analysis of Human Electrocardiogram for Biometric Recognition", *EURASIP Journal on Advances in Signal Processing*, vol. 2008, Article ID 148658, Sep. 19, 2007, 11 pp.

* cited by examiner

*Primary Examiner* — Danh Le
(74) *Attorney, Agent, or Firm* — Myers Bigel Sibley & Sajovec, P.A.

(57) ABSTRACT

A communication apparatus for connecting to a network that requires authentication is provided. The apparatus includes a network controller for connecting to the network; a controller for controlling a connection to the network via the network controller; a sensor for obtaining biometric information of a user of the communication apparatus; and a memory for storing a subscription module applied to authentication towards the network. The subscription module includes identification information created based on biometric information of the user. In order to establish a connection to the network by use of the subscription module stored in the memory, the controller obtains biometric information of the user by use of the sensor and compares the obtained biometric information to the identification information in the subscription module.

16 Claims, 6 Drawing Sheets

COMMUNICATION APPARATUS USING BIOMETRICS

TECHNICAL FIELD

The present invention relates to a communication apparatus using biometrics.

BACKGROUND

Currently, a user of a communication apparatus which accesses a mobile network such as a 3GPP network enters authentication information such as a PIN (Personal Identification Number) code, a swipe code, or the like so that the mobile network can authenticate the user. However, the authentication information is sharable and any individual who has access to this information can access the mobile network. Thus, although the mobile network can verify that authentication information assigned to a subscriber is entered, the mobile network cannot verify that this authentication information is actually entered by the subscriber who has a subscription for the mobile network.

U.S. Pat. No. 6,466,781 proposes employing biometrics to log in to a wireless transceiver. This technique makes it possible to verify that a specific person logs in to the wireless transceiver. However, it is still impossible for the mobile network to verify that the subscriber is actually using the wireless transceiver because a user can give the wireless transceiver to another person after the login procedure. It is desirable that a mobile network can verify that it is the subscriber who actually requests access to the mobile network, and who continues its usage. It is also desirable that a mobile network can verify that the subscriber does not change after the connection to the mobile network is established.

SUMMARY

According to an aspect of the invention, a communication apparatus for connecting to a network that requires authentication is provided. The apparatus includes a network controller for connecting to the network; a controller for controlling a connection to the network via the network controller; a sensor for obtaining biometric information of a user of the communication apparatus; and a memory for storing a subscription module applied to authentication towards the network. The subscription module includes identification information created based on biometric information of the user. In order to establish a connection to the network by use of the subscription module stored in the memory, the controller obtains biometric information of the user by use of the sensor and compares the obtained biometric information to the identification information in the subscription module.

Further features of the present invention will become apparent from the following description of exemplary embodiments with reference to the attached drawings.

DETAILED DESCRIPTION

Embodiments of the present invention will now be described with reference to the attached drawings. Each embodiment described below will be helpful in understanding a variety of concepts from the generic to the more specific. It should be noted that the technical scope of the present invention is defined by claims, and is not limited by each embodiment described below. In addition, not all combinations of the features described in the embodiments are always indispensable for the present invention.

Figure 1:
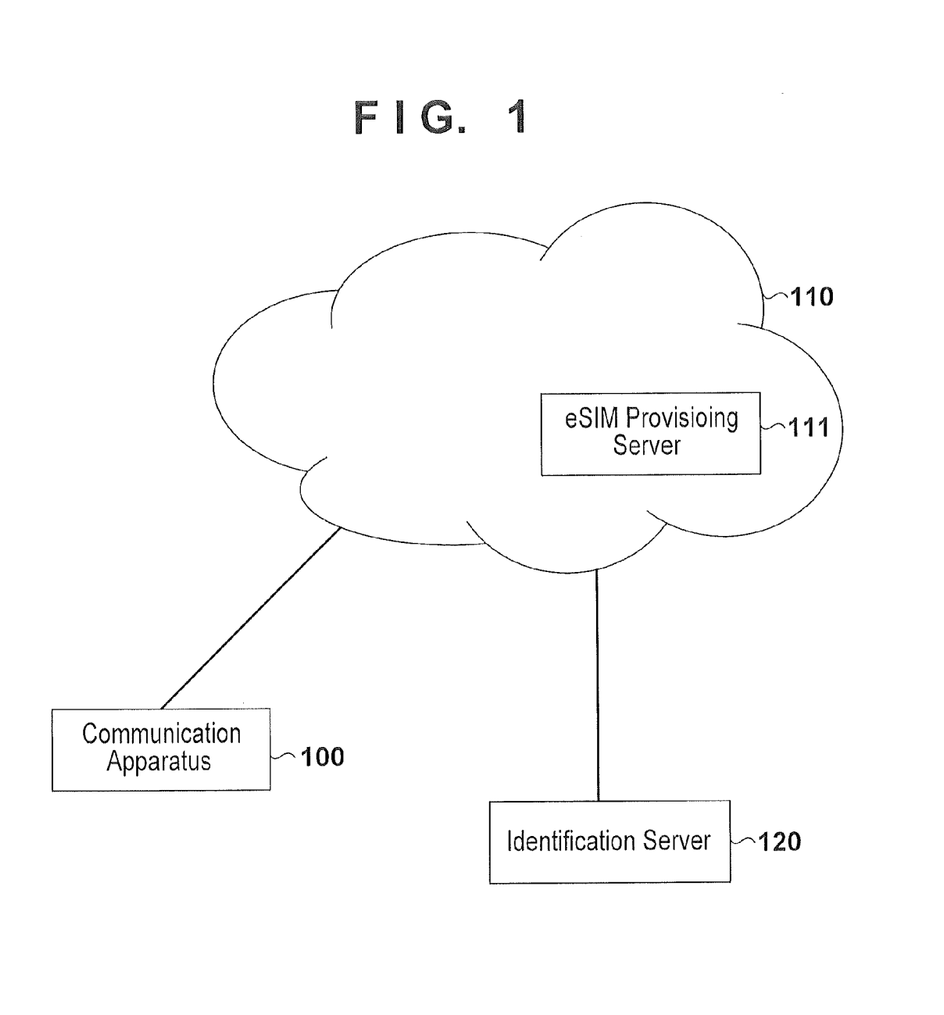
FIG. 1 illustrates an exemplary system according to some embodiments of the present invention.

FIG. 1 illustrates an exemplary system according to some embodiments of the present invention. The system may include a communication apparatus 100, a mobile network 110, and an identification server 120. A user (a subscriber) who has subscription of the mobile network 110 can use the communication apparatus 100 to connect to the mobile network 110. Examples of the communication apparatus 100 include mobile communication apparatuses such as mobile phones, tablets, laptop computers, game consoles, compact cameras; stationary communication apparatuses such as land phones, desktop computers, photocopy machines, POS terminals; vehicles such as cars, aircrafts; and other apparatuses which have a communication capability. The communication apparatus 100 obtains biometric information of the user when connecting to the mobile network 110 so that the mobile network 110 can authenticate the user of the communication apparatus 100.

The mobile network 110 is a network managed by a network operator and typically includes a Radio Access Network and a Core Network. The Radio Access Network typically includes eNodeBs and communicates with the communication apparatus 100 directly. The Core Network processes data from/to the Radio Access Network. The Core Network includes an eSIM provisioning server 111 that provisions an eSIM (embedded SIM) with the communication apparatus 100. The eSIM is a downloadable SIM (Subscriber Identification Module) now being standardized in ETSI TC SC. An eSIM is used herein as an example of a downloadable SIM, but other downloadable SIMs (downloadable subscription tokens) such as an MCIM (Machine Communication Identity Module) as defined in 3GPP TR 33.812 can be used. The SIM contains security tokens, shared secrets, and other information required to establish a mutually trusted connection between the communication apparatus 100 and the mobile network 110. The SIM also serves to uniquely identify the subscription used by various identifiers, such as the IMSI or MSISDN numbers.

In some embodiments of the present invention, an eSIM can be provisioned from the mobile network 110 to the communication apparatus 100 in an existing way as standardized in ETSI. The eSIM also contains an identification vector, which will be described in detail below. The identification server 130 can generate, or request the identification of, an identification vector used for an eSIM.

Some examples of biometric information will now be explained. Biometric information is physiological and behavioral characteristics that are unique to each individual. Examples of biometric information include physiological characteristics such as the shape of the face, the fingerprints, the hand/finger geometry, the EEG (Electroencephalogram)

pattern, the ECG (Electrocardiogram) pattern, the iris and the retina; behavioral characteristics such as the signature, the gait and the keystroke rhythm; and combinations of the physiological and behavioral characteristics such as voice biometric information.

Biometric information can be divided into other two categories; static biometric information and non-static biometric information. The static biometric information is information which does not change with the passage of time. A fingerprint is an example of the static biometric information. On the other hand, the non-static biometric information is information which changes with the passage of time or other external conditions. A heartbeat pattern is an example of the non-static biometric information. Static biometric information can be easily imitated. For example, it is known that fingerprints can be imitated using an artificial finger. However, non-static biometric information is difficult to imitate, as described in Kumar, S.; Sim, T.; Janakiraman, R.; and Sheng Zhang., "Using Continuous Biometric Verification to Protect Interactive Login Sessions," ACSAC '05 Proceedings of the 21st Annual Computer Security Applications Conference, Pages 441-450. Thus, some embodiments of the present invention use non-static biometric information for the mobile network 110 to authenticate the user of the communication apparatus 100.

Some of the non-static biometric information such as a heartbeat patterns and EEG pattern expose repetition in the space of a few seconds. Such non-static biometric information is useful to shorten the login procedure to the mobile network 110. Thus, in the following embodiments, heartbeat patterns are used as the main exemplary parameter of biometric information.

Figure 2:
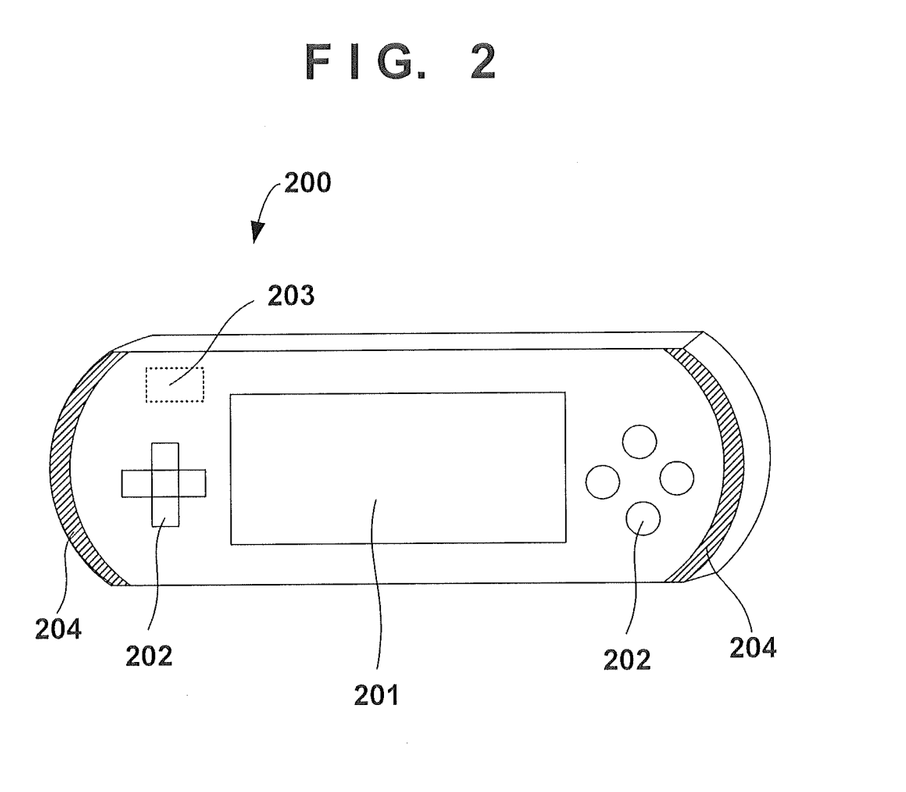
FIG. 2 illustrates an exemplary appearance of a game console 200 according to some embodiments of the present invention.

FIG. 2 illustrates an exemplary appearance of a game console 200 according to some embodiments of the present invention. The game console 200 can be used as the communication apparatus 100 in FIG. 1. The game console 200 may comprise a display 201, buttons 202, an antenna 203, and capacitive coupling contact pads 204. The display 201 and buttons 202 are user interfaces for a user of the game console 200 to play games, establish a connection with the mobile network 110, etc. The antenna 203 transmits/receives signals to/from the mobile network 110. The capacitive coupling contact pads 204 are used to obtain biometric information of the user. When a user of the game console 200 holds the game console 200 at the contact pads 204 on both sides to play a game, a closed circuit is formed by the user's body and the game console 200. Since a human body generates an electric field, and the organs modify applied electric fields, the game console 200 can obtain an ECG wave of the user through the contact pads 204.

Instead of the contact pads 204, the game console 200 may comprise another device which is sensitive enough to capture the movement of the veins, arteries, or heart itself; or their effects, such as the pulse. A sensitive microphone, a millimeter wave or terahertz radiation antenna, infrared light, laser, or many other devices can be used to detect and capture heartbeat patterns.

Figure 3:
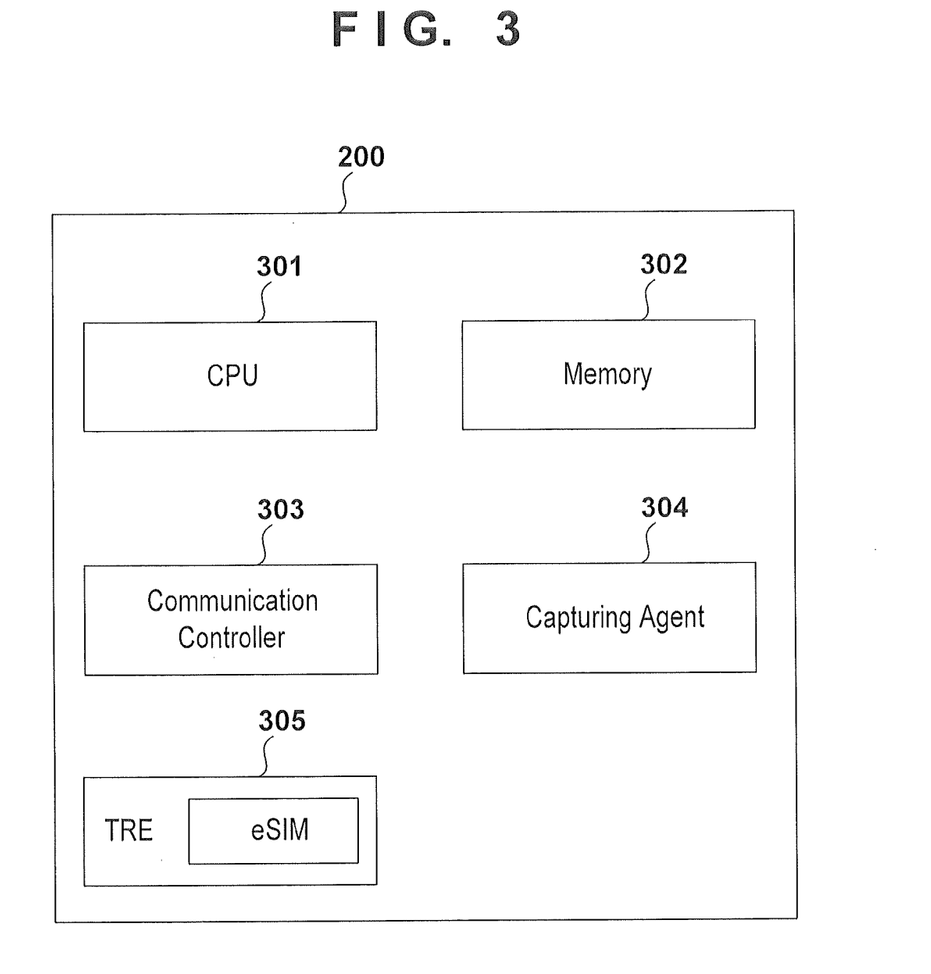
FIG. 3 illustrates a block diagram of the game console 200 in FIG. 2.

FIG. 3 illustrates a block diagram of the game console 200 in FIG. 2. The game console 200 comprises a CPU 301, a memory 302, a communication controller 303, a capturing agent 304, and a Trusted Environment (TRE) 305. The CPU 301 controls overall operations of the game console 200. The memory 302 stores computer programs and data used for operations of the game console 200. The network controller 303 controls communication with the mobile network 110 and typically comprises a baseband processor and RF transceiver.

The TRE 305 is a hardware and software component for managing an eSIM. According to the proposed standard in ETSI TC SC, the TRE 305 comprises a memory called an embedded a Universal Integrated Circuit Card (eUICC) on which an eSIM is stored. The TRE 305 also includes application(s) which enables the over-the-air provisioning and re-provisioning of an eSIM on the eUICC in a secure and controlled way.

Figure 4:
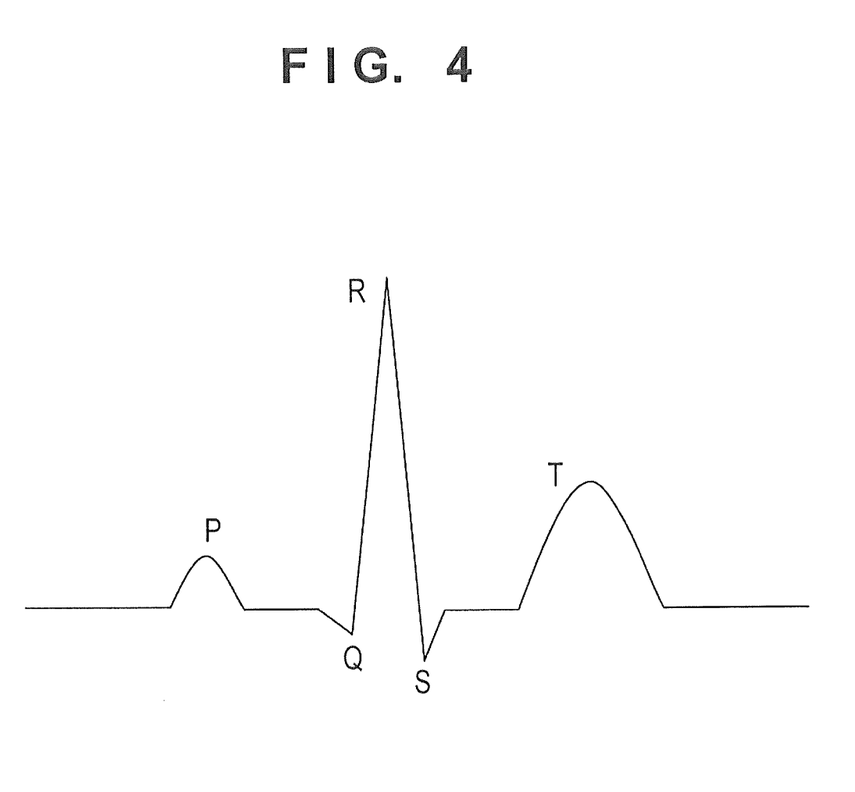
FIG. 4 illustrates an exemplary shape of an ECG wave.

The capturing agent 304 captures an ECG (electrocardiogram) wave to create a heartbeat pattern of the user of the game console 200. FIG. 4 illustrates an exemplary shape of an ECG wave. A typical ECG wave of a normal heartbeat consists of a P wave, a QRS complex, and a T wave, as described in Y. Wang, F. Agrafioti, D. Hatzinakos and K. N. Plataniotis, "Analysis of Human Electrocardiogram for Biometric Recognition," EURASIP Journal on Advances in Signal Processing, Vol. 2008, 2008, Article ID: 148658, pp. 1-11"

The heartbeats of an ECG wave are aligned by the R peak position, which are localized by using a QRS detector, and truncated by a window of 800 milliseconds (size is estimated by heuristic) centered at the R peak. There is strong evidence that the human heartbeat is a distinctive biometric trait that can be used for identity recognition. There are some solutions for biometric recognition from ECG signals based on temporal and amplitude distances between detected fiducial (fixed) points. It usually has positive polarity, and its duration is less than 120 milliseconds. The spectral characteristic of a normal P wave is usually considered to be low frequency, below 10-15 Hz. The QRS complex corresponds to depolarization of the right and left ventricles, which lasts for about 70-110 milliseconds in a normal heartbeat, and has the largest amplitude of the ECG waveforms.

Since ECG waves captured from the same and single person can differ due to change in conditions of the person, etc., the capturing agent 304 creates a heartbeat pattern based on a captured ECG wave. The heartbeat pattern is unique to an individual and the same heartbeat pattern is obtained from the same individual even if the underlying ECG waves differ. In other words, a heartbeat pattern created based on an ECG wave of a person can match another heartbeat pattern created based on another ECG wave of the same person using a pattern matching mechanism.

To create a heartbeat pattern, the capturing agent 304 captures an ECG wave for a measurement period (e.g. a few seconds) and extracts temporal and amplitude distances between fiducial points of the ECG wave to create a signature vector. Then, the capturing agent 304 performs a dimension reduction to the signature vector using PCA (Principal component analysis) or LDA (Linear discriminant analysis) for example. Finally, the capturing agent 304 classifies the signature vector using k-means or the nearest neighbor (NN) classifier for example to obtain a model of a heartbeat pattern.

Figure 5:
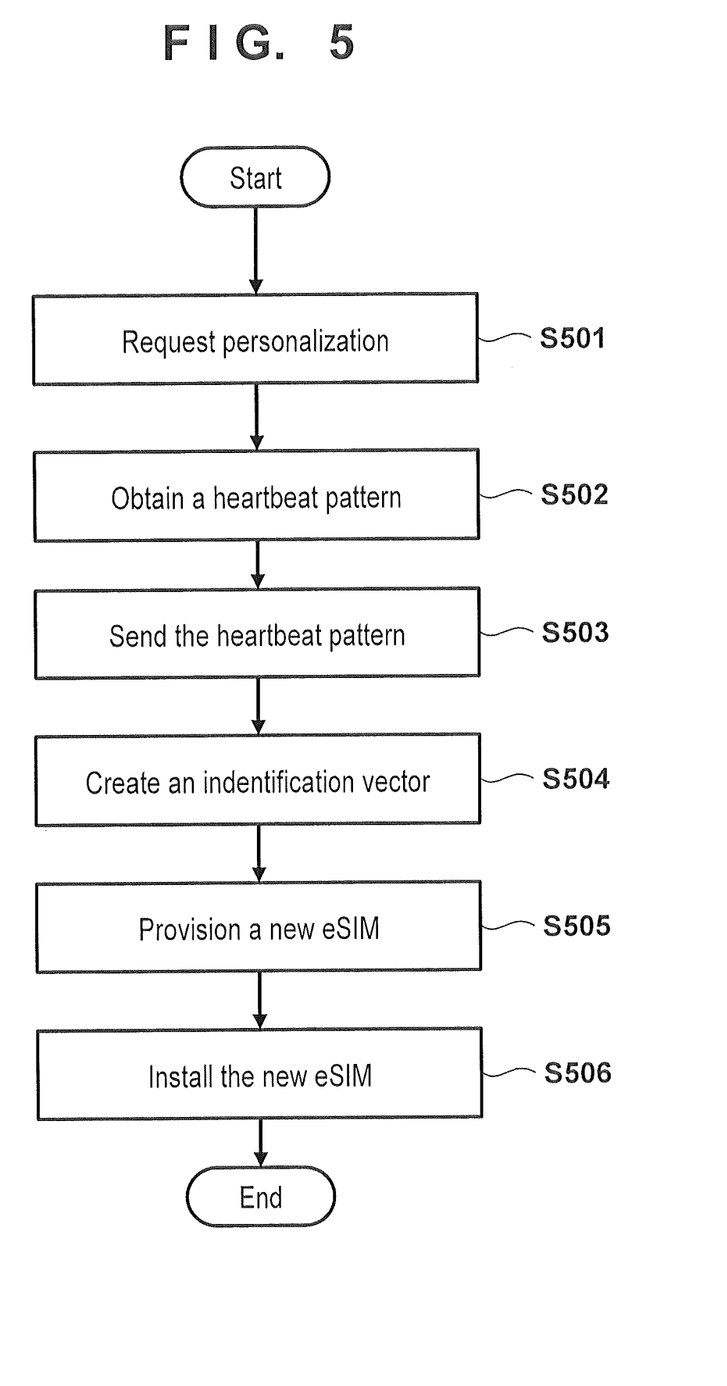
FIG. 5 illustrates an initial setting procedure for biometrics authentication according to some embodiments of the present invention.
Figure 6:
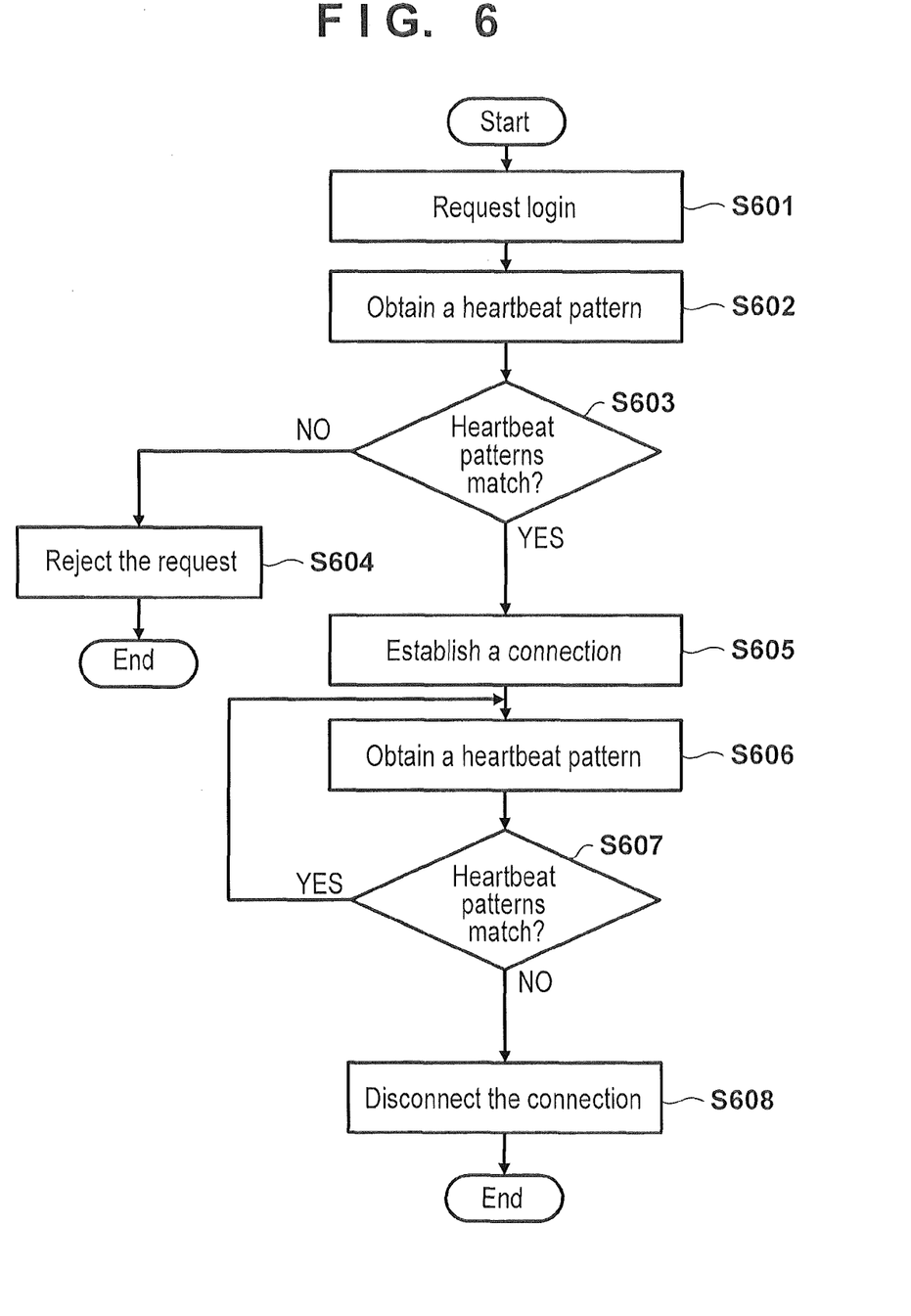
FIG. 6 illustrates a login procedure using biometrics according to some embodiments of the present invention.

FIGS. 5 and 6 illustrate exemplary operations of the system in FIG. 1. The CPU included in each device executes computer programs stored in memory of each device to process these operations. FIG. 5 illustrates an initial setting procedure for biometrics authentication. Before the initial setting procedure begins, the game console 200 already has an eSIM which has the user PIN and PUK codes and other information stored in it. This eSIM may represent an initial connectivity subscription, and not the final connectivity subscription. As described above, this eSIM is not personalized to the user since the PIN and PUK codes can be shared with another person.

In step S501, the user of the game console 200 requests a personalized eSIM to the mobile network 110 through the user interface of the game console 200 such as the display 201 and buttons 202. The user may be requested to input the PIN code of the current eSIM for identification.

In step S502, the capturing agent 304 obtains a heartbeat pattern of the user who is currently using (holding) the game console 200 based on an ECG wave captured through the contact pads 204 during a measurement period (e.g. a few seconds) as described above.

In step S503, the capturing agent 304 sends the obtained heartbeat pattern along with the user information (for example, MSISDN, etc.) to the identification server 120 over the mobile network 110.

In step S504, the identification server 120 creates an identification vector based on the received heartbeat pattern and other parameters such as the PIN code. The identification server 120 sends the identification vector to the eSIM provisioning server 111 along with the user information and requests that the identification vector be packaged in an eSIM.

In step S505, the eSIM provisioning server 111 creates a new eSIM which includes the received identification vector and other user information in conjunction with existing ways of securing communication mechanisms. The eSIM provisioning server 111 can work according to the standard currently under development in ETSI. The eSIM provisioning server 111 provisions the new eSIM with the game console 200 using standard techniques and requests the TRE 305 to replace the current eSIM with the new eSIM.

In step S506, the TRE 305 installs the new eSIM (the received eSIM) and discards or disables the previous (temporal) eSIM. Since the new eSIM includes an identification vector which is created based on the heartbeat pattern of the user, the new eSIM is personalized to this user.

FIG. 6 illustrates a login procedure using biometrics. In step S601, the user of the game console 200 requests to log in to the mobile network 110 to access the mobile network 110 using the eSIM stored in the TRE 305. The user may explicitly request a login through the user interface of the game console 200 or implicitly request a login by holding the contact pads 204 of the game console 200.

In step S602, the capturing agent 304 obtains a heartbeat pattern of the user who is currently using (holding) the game console 200 based on an ECG wave captured through the contact pads 204 during a measurement period (e.g. a few seconds) as described above, and sends the heartbeat pattern to the TRE 305.

In step S603, the TRE 305 compares the received heartbeat pattern to the heartbeat pattern included in the eSIM installed at step S506. If the received heartbeat pattern does not match one in the eSIM, the procedure goes to the S604 and the TRE 305 rejects the login request (or a subset of the installed services is exposed). If the received heartbeat pattern matches one in the eSIM, the procedure goes to the S605 and the TRE 305 establishes a connection between the game console 200 and the mobile network 110 according to the standard method.

After step S605 (that is, after the connection is established), steps S606 and S607, which are the same as steps S602 and S603 respectively, are repeated while the connection between the game console 200 and the mobile network 110 continues. At step S607, if the received heartbeat pattern does not match one in the eSIM, the procedure goes to the S608 and the TRE 305 disconnects the connection between the game console 200 and the mobile network 110. If the user of the game console 200 changes to another person after the login request is successfully accepted, the TRE 305 can detect this change and terminates the ongoing session. When the capturing agent 304 cannot capture an ECG wave at step S607, the TRE 305 may also disconnect the connection. This function makes it possible for the mobile network 110 to verify that the subscriber is currently using the game console 200.

According to the embodiments described above, the mobile network can uniquely identify an individual who is currently using the communication apparatus. The user of the communication apparatus is not bothered by authentication procedure since all the user has to do is to hold the communication apparatus. When the invention has been applied, the use of the eSIM proceeds as normal (i.e. according to standard). The only addition is that the login sequence is modified so that the verification of the Identification Vector against the heartbeat pattern is required. This can however be accommodated in the standard. Hence, apart from the insertion of the Identification Server, there is no need to modify the current mobile network or its features.

The invention claimed is:

1. A communication apparatus for connecting to a network that requires authentication, the communication apparatus comprising:
   a network controller configured to connect to the network;
   a control circuit that controls a connection to the network via the network controller;
   a sensor that obtains biometric information of a user of the communication apparatus; and
   a memory that stores a subscription module that is used for authentication towards the network, the subscription module including identification information created based on biometric information of the user;
   wherein in order to establish a connection to the network by use of the subscription module stored in the memory, the control circuit obtains biometric information of the user by use of the sensor and compares the obtained biometric information to the identification information in the subscription module, wherein the biometric information obtained by the sensor is a heartbeat pattern of the user that changes during a measurement period.

2. The communication apparatus according to claim 1, wherein the control circuit repeatedly obtains the biometric information from the sensor while a connection to the network is established, and controls the network controller to disconnect the connection in response to the obtained biometric information from the sensor not matching the identification information in the subscription module.

3. The communication apparatus according to claim 1, wherein the control circuit sends biometric information obtained by the sensor to an identification server, receives a subscription module including identification information created based on the biometric information sent to the identification server, and stores the received subscription module into the memory.

4. The communication apparatus according to claim 3, wherein the control circuit repeatedly obtains the biometric information from the sensor while a connection to the network is established, and compares the obtained biometric information to the identification information.

5. The communication apparatus according to claim 4, wherein the control circuit controls the network controller to disconnect the connection in response to when the control circuit cannot obtain the biometric information through the sensor from the user.

6. The communication apparatus according to claim 1, wherein the control circuit controls a connection through the network controller to the network in response to comparison of the biometric information, which characterizes the heartbeat pattern of the user, to the identification information in the subscription module for the user.

7. The communication apparatus according to claim 1, wherein the control circuit repeatedly obtains the biometric information, which characterizes the heartbeat pattern of the user, from the sensor while a connection of the communication apparatus to the network is maintained, and controls the network controller to disconnect the communication apparatus from connection to the network in response to the biometric information from the sensor not matching the identification information in the subscription module for the user.

8. The communication apparatus according to claim 1, wherein the control circuit repeatedly obtains the biometric information, which characterizes the heartbeat pattern of the user, from the sensor while a connection of the communication apparatus to the network is maintained, and controls the network controller to disconnect the communication apparatus from connection to the network in response to when the control circuit cannot obtain the biometric information through the sensor from the user.

9. The communication apparatus according to claim 1, wherein:
the control circuit is contained within a handheld controller of a game console.

10. The communication apparatus according to claim 1, wherein:
the communication apparatus comprises a housing having spaced apart contact pads; and
the control circuit is connected to the contact pads to receive as the biometric information an electrocardiogram signal from heartbeats of the user who's hands are contacting the contact pads.

11. The communication apparatus according to claim 10, wherein the housing comprises a handheld controller of a game console.

12. The communication apparatus according to claim 1, wherein:
the control circuit receives as the biometric information an electrocardiogram signal from heartbeats of the user.

13. The communication apparatus according to claim 12, wherein:
the control circuit extracts temporal and amplitude distances between fiducial points of the electrocardiogram signal to create the heartbeat pattern of the user.

14. The communication apparatus according to claim 13, wherein:
the control circuit creates a signature vector from the temporal and amplitude distances between fiducial points of the electrocardiogram signal, and the heartbeat pattern is created based on the signature vector.

15. The communication apparatus according to claim 14, wherein:
the control circuit performs a dimension reduction to the signature vector, and classifies the signature vector after the dimension reduction to obtain a model of the heartbeat pattern.

16. The communication apparatus according to claim 15, wherein:
the control circuit performs the dimension reduction to the signature vector using a principal component analysis or linear discriminant analysis.

\* \* \* \* \*